(12) United States Patent
May

(10) Patent No.: US 11,497,305 B1
(45) Date of Patent: Nov. 15, 2022

(54) METHOD AND SYSTEM FOR FACILITATED VIEWING OF ELECTRONIC SCREENS

(71) Applicant: Robert Carl May, Pittsburgh, PA (US)

(72) Inventor: Robert Carl May, Pittsburgh, PA (US)

(*) Notice: Subject to any disclaimer, the term of this patent is extended or adjusted under 35 U.S.C. 154(b) by 0 days.

(21) Appl. No.: 15/871,964

(22) Filed: Jan. 15, 2018

Related U.S. Application Data

(60) Provisional application No. 62/446,286, filed on Jan. 13, 2017.

(51) Int. Cl.
*A47B 21/03* (2006.01)
*A47B 23/00* (2006.01)
*B43L 15/00* (2006.01)

(52) U.S. Cl.
CPC ........ *A47B 21/0371* (2013.01); *A47B 23/001* (2013.01); *B43L 15/00* (2013.01); *A47B 23/002* (2013.01); *A47B 2200/0091* (2013.01); *A47B 2200/0092* (2013.01)

(58) Field of Classification Search
CPC ........ A47B 21/0371; A47B 2200/0091; A47B 97/04; A47B 2200/0092; A47B 2200/009; B43L 15/00; B43L 13/048; B43L 12/00; B43L 13/04; B43L 13/00; B43L 13/045; B43L 13/005; B44D 3/00; G06F 3/04886; G06F 19/3481; G06F 3/03548; G06F 3/0393; G06F 3/041
USPC ................................... 248/118, 441.1, 118.1
See application file for complete search history.

(56) References Cited

U.S. PATENT DOCUMENTS

| | | | | |
|---|---|---|---|---|
| 518,761 A | * | 4/1894 | Lloyd | B43L 13/048 33/437 |
| 794,042 A | * | 7/1905 | O'Connor | A47B 21/0371 248/118.3 |
| 1,854,721 A | * | 4/1932 | Swain | A47B 23/004 248/447 |
| 1,936,013 A | * | 11/1933 | Goldberg | A47B 3/0815 108/50.14 |
| 2,190,947 A | * | 2/1940 | Kinzler | G03F 1/90 33/615 |
| 2,511,654 A | * | 6/1950 | Spoor | B43L 13/045 33/443 |
| 2,530,437 A | * | 11/1950 | Marks | G09B 21/002 434/117 |
| 3,006,107 A | * | 10/1961 | Tolegian | A47B 97/04 248/449 |
| 3,101,568 A | * | 8/1963 | Tratt | B43L 13/04 248/118 |
| 3,273,244 A | * | 9/1966 | Goenner | B43L 13/048 33/403 |
| 3,642,321 A | * | 2/1972 | Schwarz | B60N 2/826 297/410 |

(Continued)

FOREIGN PATENT DOCUMENTS

DE         531850 C * 8/1931 ............. B43L 13/04
DE      3111715 A1 * 10/1982 ............. B43L 13/04

*Primary Examiner* — Jonathan Liu
*Assistant Examiner* — Taylor L Morris
(74) *Attorney, Agent, or Firm* — Bauer Law Offices; Robert M. Bauer

(57) ABSTRACT

The present invention, as described fully in the claims, discloses a method and system for facilitating the viewing and use of one or more electronic screens by persons with disabilities and/or injuries via therapy from the shoulders down to the fingers.

7 Claims, 4 Drawing Sheets

(56) References Cited

U.S. PATENT DOCUMENTS

| | | | | |
|---|---|---|---|---|
| 4,088,290 A * | 5/1978 | Novello | B43L 15/00 | 248/118 |
| 4,366,626 A * | 1/1983 | Livick | G09B 21/002 | 281/42 |
| 4,378,716 A * | 4/1983 | Volk | B23D 49/162 | 83/438 |
| 4,481,719 A * | 11/1984 | Grover | B43L 13/048 | 33/437 |
| 4,546,948 A * | 10/1985 | Ferrara | A47B 97/04 | 248/454 |
| 4,558,522 A * | 12/1985 | Lance | B43L 15/00 | 248/449 |
| 4,670,743 A * | 6/1987 | Zemke | G06F 3/03548 | 341/31 |
| 4,683,836 A * | 8/1987 | West | B43L 15/00 | 118/305 |
| 4,779,543 A * | 10/1988 | Kelley | B43L 5/002 | 108/139 |
| 4,973,176 A * | 11/1990 | Dietrich | A47B 21/0371 | 248/118 |
| 5,108,057 A * | 4/1992 | Dandy, III | A47B 21/0371 | 248/118 |
| 5,161,760 A * | 11/1992 | Terbrack | A47B 21/0371 | 248/118 |
| 5,165,630 A * | 11/1992 | Connor | A47B 21/0371 | 248/118.1 |
| 5,172,883 A * | 12/1992 | Amirian | A47B 97/04 | 248/118 |
| 5,193,772 A * | 3/1993 | Johnston | B43L 5/002 | 248/118.5 |
| 5,337,484 A * | 8/1994 | Cardon | B43L 13/201 | 33/41.2 |
| 5,386,957 A * | 2/1995 | Miller | A47B 21/0371 | 248/118.5 |
| 5,442,984 A * | 8/1995 | Tate | B23D 45/027 | 144/287 |
| 5,465,931 A * | 11/1995 | MacDonald | A47B 21/0371 | 248/118.3 |
| 5,472,161 A * | 12/1995 | Krukovsky | A47B 21/0371 | 248/118.5 |
| 5,490,647 A * | 2/1996 | Rice | G06F 3/0395 | 248/118.1 |
| 5,660,117 A * | 8/1997 | Noble | A47B 23/043 | 108/35 |
| 5,704,037 A * | 12/1997 | Chen | G06F 3/0213 | 345/157 |
| 5,713,544 A * | 2/1998 | Wolf | G06F 3/0395 | 248/118 |
| 5,746,402 A * | 5/1998 | Ambrose | G06F 3/0202 | 248/118 |
| 5,829,899 A * | 11/1998 | Chao | A47B 21/0371 | 400/715 |
| 5,845,884 A * | 12/1998 | Terbrack | A47B 21/0371 | 248/118 |
| 5,881,976 A * | 3/1999 | Gutowski | A47B 21/0371 | 248/118.1 |
| 5,915,655 A * | 6/1999 | Gutowski | A47B 21/0371 | 248/118.1 |
| 5,971,331 A * | 10/1999 | Getsay | A47B 21/0371 | 248/118 |
| 6,000,665 A * | 12/1999 | Clementson | A47B 21/0371 | 248/118 |
| 6,129,318 A * | 10/2000 | Paulse | A47B 21/0371 | 248/118.3 |
| 6,170,792 B1 * | 1/2001 | Miceli | A47B 97/08 | 248/441.1 |
| 6,247,672 B1 * | 6/2001 | Bello | A47B 21/0371 | 248/118.1 |
| 6,488,244 B2 * | 12/2002 | Ruan | A47B 21/0371 | 248/118.1 |
| 6,494,418 B1 * | 12/2002 | Wolf | G06F 3/0395 | 248/118 |
| 6,547,193 B2 * | 4/2003 | Money | A47B 21/0371 | 248/118 |
| 6,568,650 B2 * | 5/2003 | Helmetsie | F16M 13/00 | 248/205.2 |
| 6,637,350 B2 * | 10/2003 | McKsymick | A47B 21/00 | 108/25 |
| 6,691,972 B1 * | 2/2004 | Oliver | A47B 97/04 | 248/118.3 |
| 6,726,070 B2 * | 4/2004 | Lautner | A44C 5/0007 | 224/221 |
| 7,007,902 B1 * | 3/2006 | Root | A47B 21/0371 | 248/118.3 |
| 7,088,578 B1 * | 8/2006 | Gruby | A45C 11/00 | 361/679.56 |
| 7,497,406 B2 * | 3/2009 | Hudson | B44D 3/00 | 101/127.1 |
| 7,543,790 B2 * | 6/2009 | Starcher | A47B 97/08 | 248/163.1 |
| 7,694,931 B2 * | 4/2010 | Mantelli | G09B 11/02 | 248/118.3 |
| 7,926,397 B2 * | 4/2011 | Logan | B23D 47/02 | 83/471 |
| 8,007,061 B2 * | 8/2011 | Song | A47B 88/40 | 312/334.8 |
| 8,061,668 B1 * | 11/2011 | Cvek | A47B 21/0314 | 248/291.1 |
| 8,127,457 B2 * | 3/2012 | Stoklosa | B25H 7/04 | 33/32.2 |
| 9,201,536 B2 * | 12/2015 | Imai | G06F 3/03547 | |
| 9,204,718 B2 * | 12/2015 | Magaudda | A47B 23/044 | |
| 9,205,945 B2 * | 12/2015 | Flynn | B65C 9/00 | |
| 9,221,296 B2 * | 12/2015 | Duffy | B44D 3/00 | |
| 9,418,267 B1 * | 8/2016 | Josey | H01Q 1/243 | |
| 9,581,286 B2 * | 2/2017 | Hansen | F16M 13/00 | |
| 10,054,980 B2 * | 8/2018 | Strieby | G06F 1/1607 | |
| 2002/0130226 A1 * | 9/2002 | Nogueira | A47B 21/0371 | 248/118.5 |
| 2002/0158172 A1 * | 10/2002 | Holdren | B43L 15/00 | 248/118.5 |
| 2003/0209641 A1 * | 11/2003 | Cooke | G05G 1/62 | 248/118 |
| 2004/0060687 A1 * | 4/2004 | Moss, II | G06F 1/203 | 165/80.3 |
| 2004/0256535 A1 * | 12/2004 | Desch | A47B 23/042 | 248/460 |
| 2005/0092871 A1 * | 5/2005 | Wolf | A47B 21/0371 | 248/118.1 |
| 2006/0118679 A1 * | 6/2006 | Delgado | G06F 3/039 | 248/118 |
| 2006/0209037 A1 * | 9/2006 | Wang | G06F 3/03548 | 345/173 |
| 2007/0007422 A1 * | 1/2007 | Rha | A47B 23/007 | 248/447.1 |
| 2007/0295580 A1 * | 12/2007 | Solomon | B65G 1/127 | 198/468.6 |
| 2008/0048977 A1 * | 2/2008 | Akieda | G06F 3/03548 | 345/157 |
| 2012/0105335 A1 * | 5/2012 | Suddreth | G06F 1/1601 | 345/173 |
| 2012/0168575 A1 * | 7/2012 | Atzmon | A47B 21/0371 | 248/118 |
| 2013/0147721 A1 * | 6/2013 | McGeever | G06F 3/041 | 345/173 |
| 2014/0153182 A1 * | 6/2014 | North | F16M 13/00 | 361/679.41 |
| 2014/0339381 A1 * | 11/2014 | Weldon | A47K 3/004 | 248/126 |
| 2015/0084886 A1 * | 3/2015 | Kamiyama | G06F 3/03548 | 345/173 |
| 2015/0286303 A1 * | 10/2015 | Lee | G06F 3/039 | 345/173 |
| 2015/0370351 A1 * | 12/2015 | Wu | G06F 3/046 | 345/173 |

(56) References Cited

U.S. PATENT DOCUMENTS

| | | | |
|---|---|---|---|
| 2016/0066685 A1* | 3/2016 | Mitchell | A47B 21/0371 |
| | | | 248/118.1 |
| 2019/0281976 A1* | 9/2019 | Taylor | A47B 21/04 |
| 2021/0015252 A1* | 1/2021 | Jesus | A61F 5/0118 |

* cited by examiner

METHOD AND SYSTEM FOR FACILITATED VIEWING OF ELECTRONIC SCREENS

REFERENCE TO RELATED PATENT APPLICATION

This nonprovisional patent application has the benefit of provisional patent application 62/446,286 and incorporates the contents of said provisional patent application by reference in its entirety.

STATEMENT REGARDING FEDERALLY SPONSORED RESEARCH OR DEVELOPMENT

Not Applicable

NOTICE OF COPYRIGHTS AND TRADE DRESS

A portion of the disclosure of this patent document contains material that is subject to copyright protection. This patent document may show and/or describe matter that is or may become trade dress of the owner. The copyright owner and the trade dress owner have no objection to the facsimile reproduction by anyone of the patent disclosure as it appears in the Patent and Trademark Office patent files or records, but otherwise reserves all copyrights and trade dress rights whatsoever.

TECHNICAL FIELD

The present invention relates generally to the facilitation of the viewing and use of electronic screens by disabled or injured persons.

BACKGROUND

For injured persons and disabled persons there have long existed problems in viewing and using electronic screens such as those on tablet computers. For instance, those without good depth perception have long felt the need for a stable means for viewing and using electronic screens.

A variety of approaches have attempted to meet these needs, however, none of the prior art methods have succeeded in solving these issues for a broad population. In general, there is an unmet need for a practical and efficient device that can facilitate the viewing and use of electronic screens by injured persons and disabled persons. The need is particularly great at the present moment as the number of persons with need for such a device is higher than ever and increasing rapidly.

SUMMARY

The main purpose of the present invention is to eliminate the known drawbacks of prior art inventions such as lack of stability, lack of ease of use, and lack of 360 degrees of mobility. These and other objectives are addressed by the present invention as will be apparent from the following description and claims.

In general, in an aspect, an apparatus for viewing and using electronic screens comprising a base, non-slip legs, two or more hand guides, and a tray area. In general, in an aspect, the base of said apparatus including a durable plastic bottom. In general, in an aspect, said apparatus wherein said hand guides are made of plexiglass or heavy-duty plastic, or wood.

In general, in an aspect, an apparatus wherein hand guides glide over top of a plastic base. In general, in an aspect, an apparatus wherein hand guides have soft cushions on the top of each hand guide and said hand guides are attached to a non-slip bottom.

In general, in an aspect, an apparatus wherein one or more hand guides comprise a bottom that remains square to the base and moves vertically on rails which glide in grooves in the sides of said base and where the uppermost hand guide moves horizontally in rails gliding in grooves located in the bottom of one of said hand guides.

In general, in an aspect, an apparatus wherein one of said hand guides is 1.5 times the diagonal distance of said base. In general, in an aspect, a system for viewing and using electronic screens comprising a base, non-slip legs, two or more hand guides, and a tray area. In general, in an aspect, a system wherein the base has a durable plastic bottom. In general, in an aspect, a system wherein hand guides are constructed of plexiglass, heavy duty plastic, or wood.

In general, in an aspect, a system wherein hand guides glide over the top of a plastic base. In general, in an aspect, a system wherein hand guides have a soft cushion attached to the top and the hand guides are attached to a non-slip bottom.

In general, in an aspect, a system wherein one or more of hand guides comprises a bottom that remains square to the base and moves vertically on rails which glide in grooves in the sides of said base and where the uppermost hand guide moves horizontally in rails gliding in grooves located in the bottom of one of said hand guides.

In general, in an aspect, a system wherein one hand guide comprises 1.5 times the diagonal distance of the base. In general, in an aspect, a method for viewing and using electronic screens comprising sliding one or more hand guides via grooves in a vertical direction in an apparatus as described above. In general, in an aspect, a method for viewing and using electronic screens comprising sliding one or more hand guides via grooves in a horizontal direction in an apparatus as described above. In general, in an aspect, a method for viewing and using electronic screens comprising sliding one or more hand guides with 360 degrees of mobility and access to one or more items in an attached tray.

Implementations may include one or a combination of any two or more of the following features: a rectangular base, that is Teflon [this is a registered trademark of The Chemours Company FC, LLC with a principal place of business in Wilmington, Del.] coated and has a strong plastic bottom and non-slip legs. Other features are two hand guides made of plexiglass or heavy-duty plastic that are located slightly above the device's screen or whatever objects that the user is manipulating, said screen or objects being located in a tray area. Another feature is that both hand guides glide over or on top of a slick plastic base and have an optional soft cushion for the top of the hand guide that has a non-slip bottom for stable usage. The two hand guides rest on top of one another and stay square to the base and move vertically or horizontally via gliding in grooves in the sides of the base. This design creates 360 degrees of freedom for the user even if the apparatus, called an iEasel™, is turned 90 degrees.

In general, in another aspect, a simple, efficient method for allowing a user to access any part of a screen with stability and ease of operation and comfort in a series of steps.

Implementations may include one or a combination of any two or more of the following steps. A step for sliding a hand guide, termed an "Easy Mover™" vertically via grooves in the sides of the base of the aforementioned apparatus. A step for sliding a hand guide, termed the "Free Flow Stick™", horizontally via grooves in the base of the aforementioned apparatus.

These and other aspects, features, implementations, and advantages, and combinations of them, can be expressed as methods, apparatus, systems, components, program products, business methods, and means or steps for performing functions, or combinations of them.

Other features, aspects, implementations, and advantages will become apparent from the description, the drawings, and the claims.

BRIEF DESCRIPTION OF THE DRAWINGS

The accompanying drawings illustrate several embodiments of the invention and, together with the description, serve to explain the principles of the invention according to the embodiments. One skilled in the art will recognize the particular embodiments illustrated in the drawings are merely exemplary and are not intended to limit the scope of the present invention, which is more fully described in the claims.

DETAILED DESCRIPTION OF THE EMBODIMENTS

Figure 1:
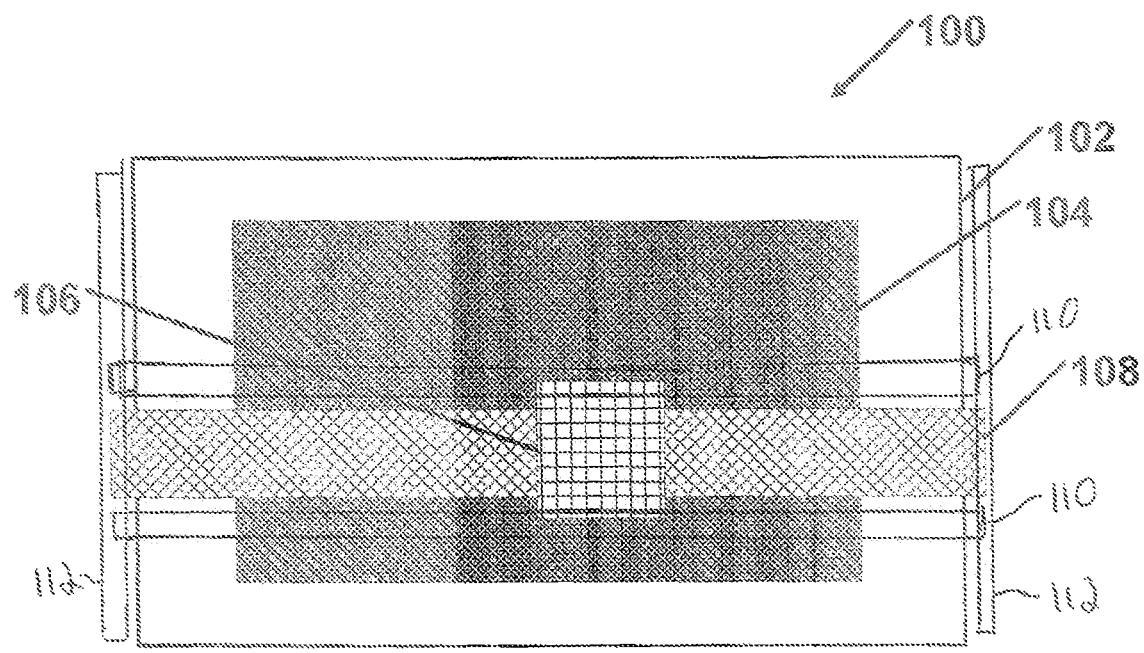
FIG. 1 is a top down perspective view of an exemplary computer display easel according to the present invention, which is more fully described in the claims.

Various techniques will now be described in detail with reference to a few example embodiments thereof as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some, or all, of these specific details. In other instances, well known process steps and/or structures have not been described in detail in order not to obscure some of the aspects and/or features described or referenced herein.

One or more different inventions may be described in the instant patent application. Further, for one or more of the invention(s) described herein, numerous embodiments may be described in the instant patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, and other changes may be made without departing from the scope of the one or more invention(s). Accordingly, those skilled in the art will recognize that the one or more of the invention(s) may be practiced in various modifications and alterations. Particular features in the one or more invention(s) may be described with reference to one or more particular embodiments of figures that form a part of the present disclosure, and in which are shown, by way of illustration, specific embodiments of the one or more invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of the invention.

Further, although process steps, method steps, algorithms or the like may be described in a sequential order, such processes, methods and algorithms may be configured to work in alternate orders. In other words, any sequence or order of steps that may be described in the instant patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

When a single device or article is described, more than one device/article (whether or not they cooperate) may be used in place of a single device/article. Similarly, where more than one device or article is described (whether or not they cooperate), a single device/article may be used in place of the more than one device or article.

Techniques and mechanisms described or referenced herein will sometimes be described in singular form for clarity. However, particular embodiments include multiple iterations of a technique or multiple instantiations of a mechanism unless noted otherwise.

The system described here enables a computer user to interact manually with a computer display ergonomically, for example an iPad® [this is a registered trademark of Apple Inc., with a principal place of business in Cupertino, Calif.].

As desired, the easel system may include more or fewer than the components illustrated. The visual easel device is described above with reference to diagrams of systems, methods, and/or apparatuses according to examples. Generally, the visual easel device disclosed herein may be implemented by an efficient manufacturing process.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

As shown in FIG. 1, the visual easel device, 100, comprises a framework, 102, surrounding a touch-sensitive, computer-generated visual display, 104, with an adjustable horizontal slider, 106, attached to rails 440 on either side of a transparent bar, 108, attached at either end to sliders that move vertically along the sides of said framework, 102.

Figure 2:
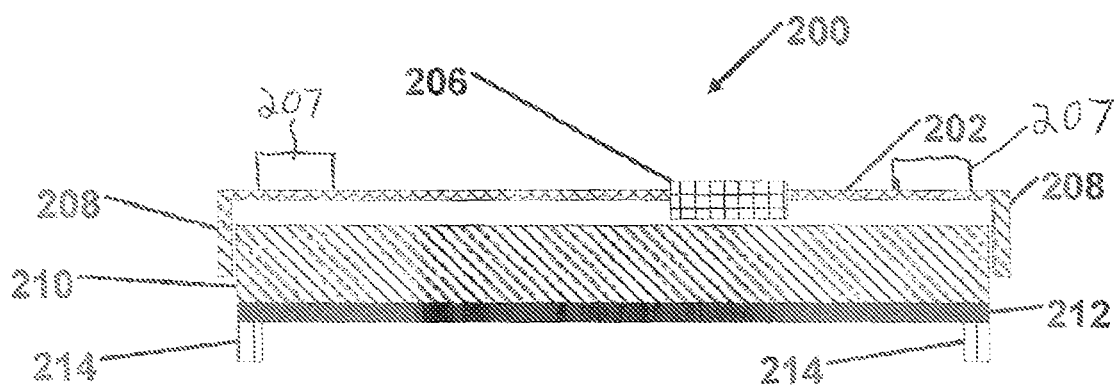
FIG. 2 is an end-on view of an exemplary computer display easel according to the present invention, which is more fully described in the claims, in the initial default position.

Shown in FIG. 2 is the end view, 200, of an exemplary computer display easel according to the present invention, described more fully in the claims, in the initial default position. The vertical slider, 202, attaches at either side to supports, 208, that glide on rails of the framework, 210. Attached to said vertical slider, 202, is a movable horizontal slider. The framework, 210, surrounding said touch-sensitive computer-generated visual display rests on a base, 212, supported by legs, 214, resting on a work surface.

Figure 3:
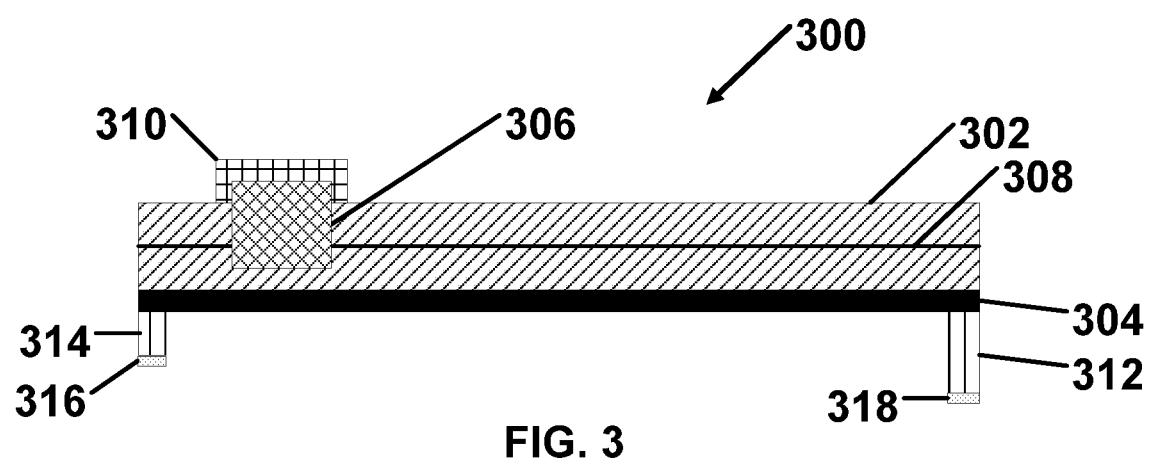
FIG. 3 is a side-on view of an exemplary computer display easel according to the present invention, which is more fully described in the claims.

As shown in FIG. 3 side-on view, 300, of an exemplary computer display easel according to the present invention, the visual easel framework, 302, rests on a solid base, 304, supported by legs, 312, and, 314, that can be adjusted for tilt for ease of use. Each of the legs has a non-slip pad as illustrated in this exemplary side-on view by 316 and 318. The solid base, 304, has a non-scratch surface composed of Teflon or a similar surface. The horizontal slider, 310, is adjustably attached to the vertical slider, 306, either end of which can move along a rail, 308, embedded in the framework, 302.

Figure 4:
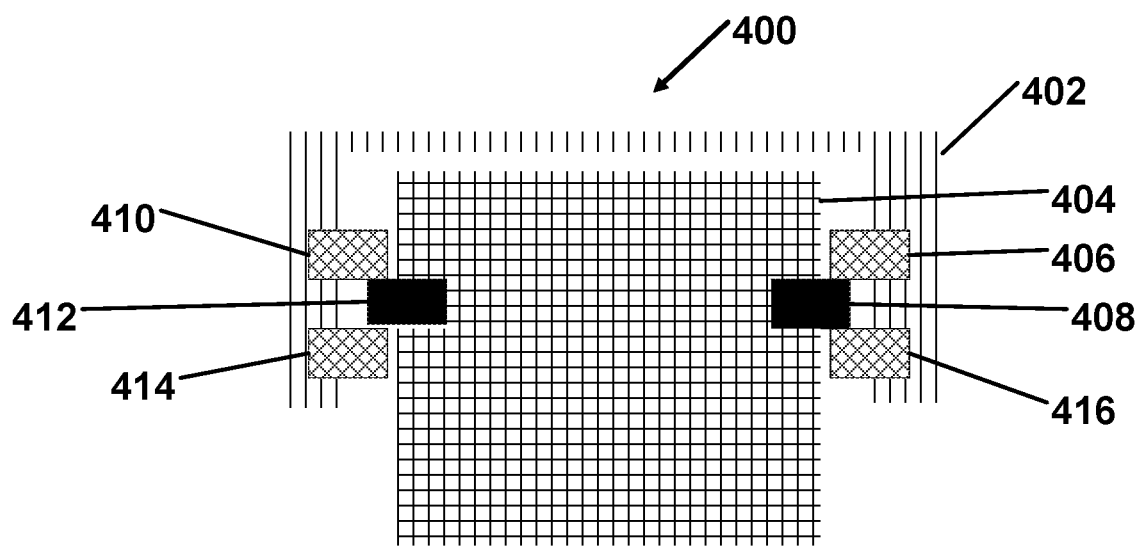
FIG. 4, a cross section of the attachment of a slider according to the present invention, which is more fully described in the claims.

As shown in FIG. 4, a cross section, 400, of the attachment of a slider, 402, to its corresponding railings, 408, 412, embedded in the framework, 404. The upper railing mounts, 406 and 410, and the lower railing mounts, 414 and 416, provide the track for movement along the railings. The railings and railing mounts, composed for instance of Teflon, have a low friction interface so the operator can position the slider with little effort.

While described with specific embodiments, it is understood that other variations of the invention are possible and are intended to be included. The scope of the invention is to be limited only by the scope of the claims attached hereto.

The accompanying drawings illustrate several embodiments of the invention and, together with the description, serve to explain the principles of the invention according to the embodiments. One skilled in the art will recognize the particular embodiments illustrated in the drawings are merely exemplary, and are not intended to limit the scope of the present invention.

When a single device or article is described, more than one device/article (whether or not they cooperate) may be used in place of a single device/article. Similarly, where more than one device or article is described (whether or not they cooperate), a single device/article may be used in place of the more than one device or article.

Techniques and mechanisms described or referenced herein will sometimes be described in singular form for clarity. However, particular embodiments include multiple iterations of a technique or multiple instantiations of a mechanism unless noted otherwise.

The system described here enables a computer user to interact manually with a computer display, for example an iPad [this is a registered trademark of Apple Inc., with a principal place of business in Cupertino, Calif.], ergonomically.

As desired, the easel system may include more or fewer than the components illustrated. The visual easel device is described above with reference to diagrams of systems, methods, and/or apparatuses according to examples. Generally, the visual easel device disclosed herein may be implemented by an efficient manufacturing process.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While described with specific embodiments, it is understood that other variations of the invention are possible and are intended to be included. The scope of the invention is to be limited only by the scope of the claims attached hereto.

The embodiments of the invention in which an exclusive property or privilege is claimed are defined as follows:

1. A visual display easel device for users with reduced mobility, the device comprising
   a rectangular framework securing a touch-sensitive, computer-generated visual display, the rectangular framework having four corners and a length greater than its width, said rectangular framework attached to a base and supported at each one of said four corners by a respective one of four height-adjustable, non-slip legs resting on a level, flat work surface;
   a transparent horizontal bar having two ends, the ends of said transparent horizontal bar fitting on a first plurality of transport rails in said rectangular framework and extending in a first direction parallel to the length or width of said rectangular framework, and
   a movable wrist rest having a second plurality of transport rails, said second plurality of transport rails extending in a second direction perpendicular to the first direction, wherein said second plurality of transport rails glide in grooves located in said transparent horizontal bar;
   wherein pressure in the first direction of said rectangular framework produces movement of said transparent horizontal bar along said first plurality of transport rails,
   said rectangular framework and said base forming a tray area for supporting said touch-sensitive, computer-generated, visual display.

2. The apparatus of claim 1 wherein said transparent horizontal bar comprises a bottom that remains square to the base and moves on the first plurality of transport rails; and wherein the moveable wrist rest is configured to move horizontally.

3. The system of claim 2, wherein the first plurality of transport rails have a coating comprised of polytetrafluoroethylene.

4. The apparatus of claim 1, wherein the first plurality of transport rails is located in sides of said rectangular framework and extends for the entire sides of said rectangular framework.

5. A visual display easel system for users having reduced upper mobility, the system comprising
   a support system for a touch-sensitive, computer-generated visual display; said support system attached to a polytetrafluoroethylene-coated base configured to support said display and supported by four height-adjustable, non-slip legs resting on a level, flat work surface;
   a transport system surmounted on said support system having two ends, the ends of said transport system fitting on a first plurality of transport rails affixed to said support system, and having a second plurality of transport rails connected to a movable wrist rest, said second plurality of transport rails extending in a direction which is perpendicular to direction in which said first plurality of transport rails extend;

wherein said transport system comprises a bottom that remains square to the polytetrafluoroethylene-coated base and moves on said first plurality of transport rails in sides of said support system and where the movable wrist rest moves horizontally on said second plurality of transport rails gliding in grooves located in said transport system, wherein pressure in the direction in which the first plurality of transport rails extend produces movement of said transport system along said first plurality of transport rails;

said support system and said polytetrafluoroethylene-coated base forming a tray area for supporting said touch-sensitive, computer-generated visual display.

6. A visual display easel system for users having reduced upper mobility, the system comprising a support system for a touch-sensitive, computer-generated visual display; said support system attached to a base configured to support said display and supported by four height-adjustable, non-slip legs resting on a level, flat work surface;

a transport system surmounted on said support system having two ends, the ends of said transport system fitting on a first plurality of transport rails affixed to said support system, and having a second plurality of transport rails connected to a movable wrist rest, said second plurality of transport rails extending in a direction which is perpendicular to direction in which said first plurality of transport rails extend;

wherein said transport system comprises a bottom that remains square to the base and is configured to move on the first plurality of transport rails; and wherein the moveable wrist rest is configured to move horizontally on the second plurality of transport rails located in the bottom of said transport system;

wherein pressure in the direction in which the first plurality of transport rails extend produces movement of said transport system along said first plurality of transport rails;

said support system and said base forming a tray area for supporting said touch-sensitive, computer-generated visual display.

7. The system of claim 6, wherein the first plurality of transport rails have a coating comprised of polytetrafluoroethylene.

* * * * *